(12) United States Patent
Fiebig et al.

(10) Patent No.: US 9,789,416 B2
(45) Date of Patent: Oct. 17, 2017

(54) SUPPORT SYSTEM FOR AUTONOMOUSLY CONTROLLED MOBILE DEVICES

(71) Applicant: Anki, Inc., San Francisco, CA (US)

(72) Inventors: Charles Fiebig, El Cerrito, CA (US); Hanns Tappeiner, San Francisco, CA (US); David McVicar, El Dorado, CA (US)

(73) Assignee: Anki, Inc., San Francisco, CA (US)

( * ) Notice: Subject to any disclaimer, the term of this patent is extended or adjusted under 35 U.S.C. 154(b) by 234 days.

(21) Appl. No.: 14/615,817

(22) Filed: Feb. 6, 2015

(65) Prior Publication Data

US 2016/0228783 A1    Aug. 11, 2016

(51) Int. Cl.
- *A63H 18/02* (2006.01)
- *F16B 1/00* (2006.01)
- *A63H 19/30* (2006.01)

(52) U.S. Cl.
CPC ............ *A63H 18/02* (2013.01); *A63H 19/30* (2013.01); *F16B 1/00* (2013.01); *F16B 2001/0035* (2013.01)

(58) Field of Classification Search
CPC ...... A63H 18/00; A63H 18/02; A63H 18/021; A63H 18/028; A63H 19/30; A63H 19/36
See application file for complete search history.

(56) References Cited

U.S. PATENT DOCUMENTS

| | | |
|---|---|---|
| D139,568 S | 11/1944 | Hinchman |
| 2,614,755 A | 10/1952 | Binaut |
| D186,812 S | 12/1959 | Reidelbach, Jr. |
| 3,000,573 A | 9/1961 | Schlau |
| 3,734,404 A | 5/1973 | Baynes et al. |
| 4,091,995 A | 5/1978 | Barlow et al. |
| 4,106,695 A | 8/1978 | Carella et al. |
| D259,080 S | 5/1981 | Conti |
| 4,286,752 A | 9/1981 | Cheng |
| D261,292 S | 10/1981 | Tong |
| D297,851 S | 9/1988 | Schroll |
| 4,953,785 A | 9/1990 | Keska |
| 5,405,080 A | 4/1995 | Yeung et al. |
| 5,779,145 A | 7/1998 | Zelle et al. |
| 6,093,079 A | 7/2000 | House |
| 6,883,720 B2 | 4/2005 | D'Angelo, Jr. et al. |
| 6,974,086 B2 | 12/2005 | Cheng |
| D552,452 S | 10/2007 | Emblin |
| D632,348 S | 2/2011 | McNutt |
| 7,963,456 B2 | 6/2011 | Stadlbauer |
| D651,661 S | 1/2012 | Yuen |
| 8,342,903 B2 * | 1/2013 | O'Connor ............ A63H 18/028 238/10 A |
| D702,533 S | 4/2014 | Noturno |
| D707,757 S | 6/2014 | Mimlitch, III et al. |

(Continued)

*Primary Examiner* — R. J. McCarry, Jr.

(74) *Attorney, Agent, or Firm* — Fish & Richardson P.C.

(57) ABSTRACT

A system of interconnected flexible supports are adapted for use with a mobile device operative by a mobile computing device such as a smart phone and/or tablet for controlled movement of the mobile device in a plurality of directions. The system includes a plurality of flexible supports which may be magnetically coupled together to form a flexible layout having infinite configurations. The supports are configured to be self-aligned when coupled by the magnetic attraction between adjacent supports.

36 Claims, 12 Drawing Sheets

(56) References Cited

U.S. PATENT DOCUMENTS

| | | |
|---|---|---|
| D723,474 S | 3/2015 | Olsson et al. |
| 8,986,064 B2 | 3/2015 | Spielberger et al. |
| D727,715 S | 4/2015 | Munson |
| 2004/0050226 A1 | 3/2004 | Oetlinger |
| 2008/0265049 A1 | 10/2008 | Stadlbauer |
| 2009/0141457 A1 | 6/2009 | Fujikawa |
| 2009/0251256 A1* | 10/2009 | Fullerton ............... H01F 7/0284 335/296 |
| 2010/0248586 A1* | 9/2010 | Cochella ................ A63H 18/02 446/444 |
| 2010/0304640 A1 | 12/2010 | Sofman et al. |
| 2012/0061484 A1* | 3/2012 | Payne .................... A63H 18/10 238/10 A |
| 2013/0095726 A1 | 4/2013 | Sofman et al. |
| 2013/0256483 A1 | 10/2013 | Dixon |
| 2013/0324250 A1 | 12/2013 | Sofman et al. |
| 2014/0017974 A1 | 1/2014 | Sofman et al. |
| 2014/0232145 A1 | 8/2014 | Lanard et al. |
| 2014/0235136 A1 | 8/2014 | Sofman et al. |
| 2014/0235138 A1 | 8/2014 | Sofman et al. |
| 2014/0342834 A1 | 11/2014 | Tappeiner et al. |
| 2014/0346302 A1 | 11/2014 | Vignali et al. |

\* cited by examiner

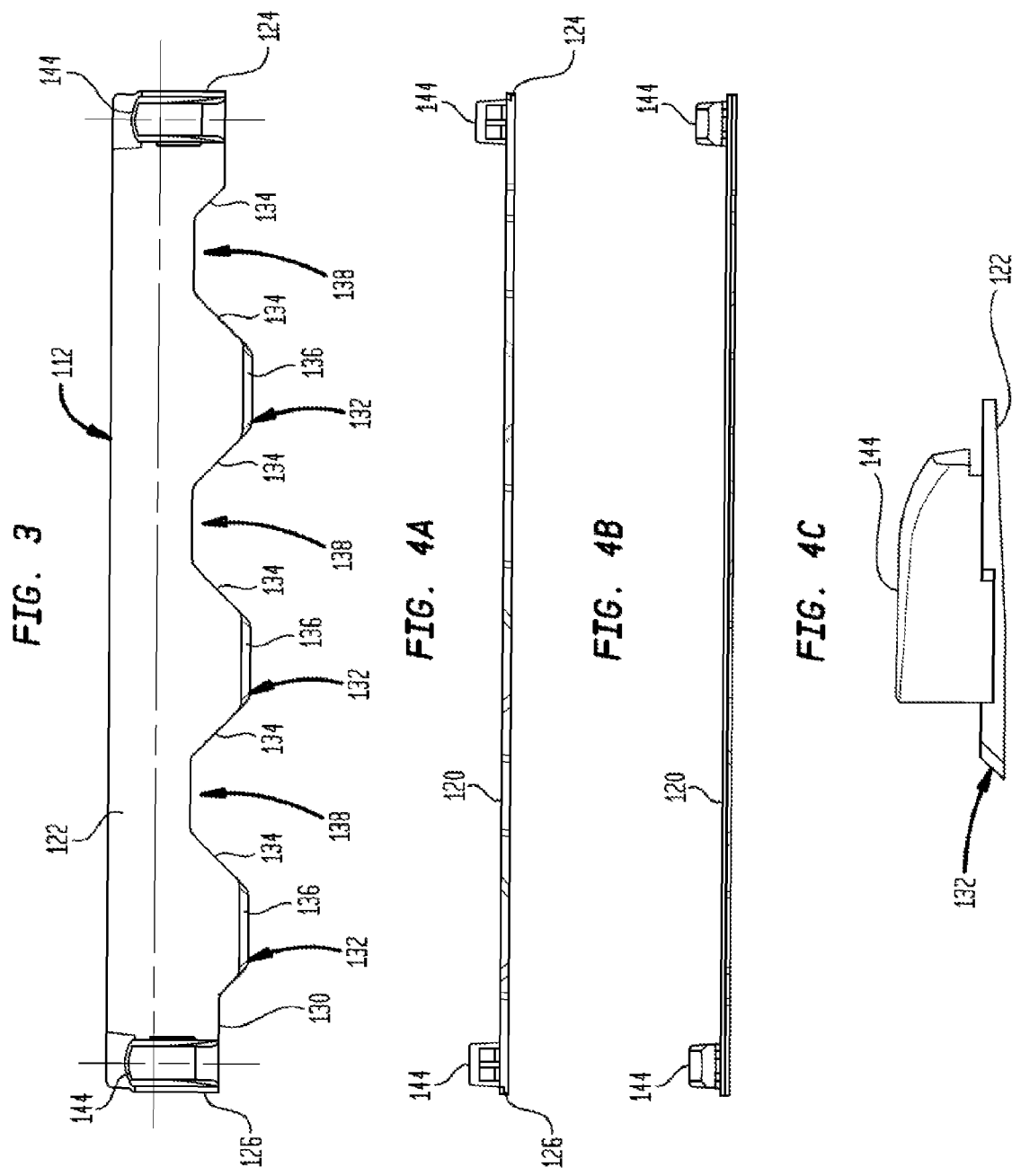

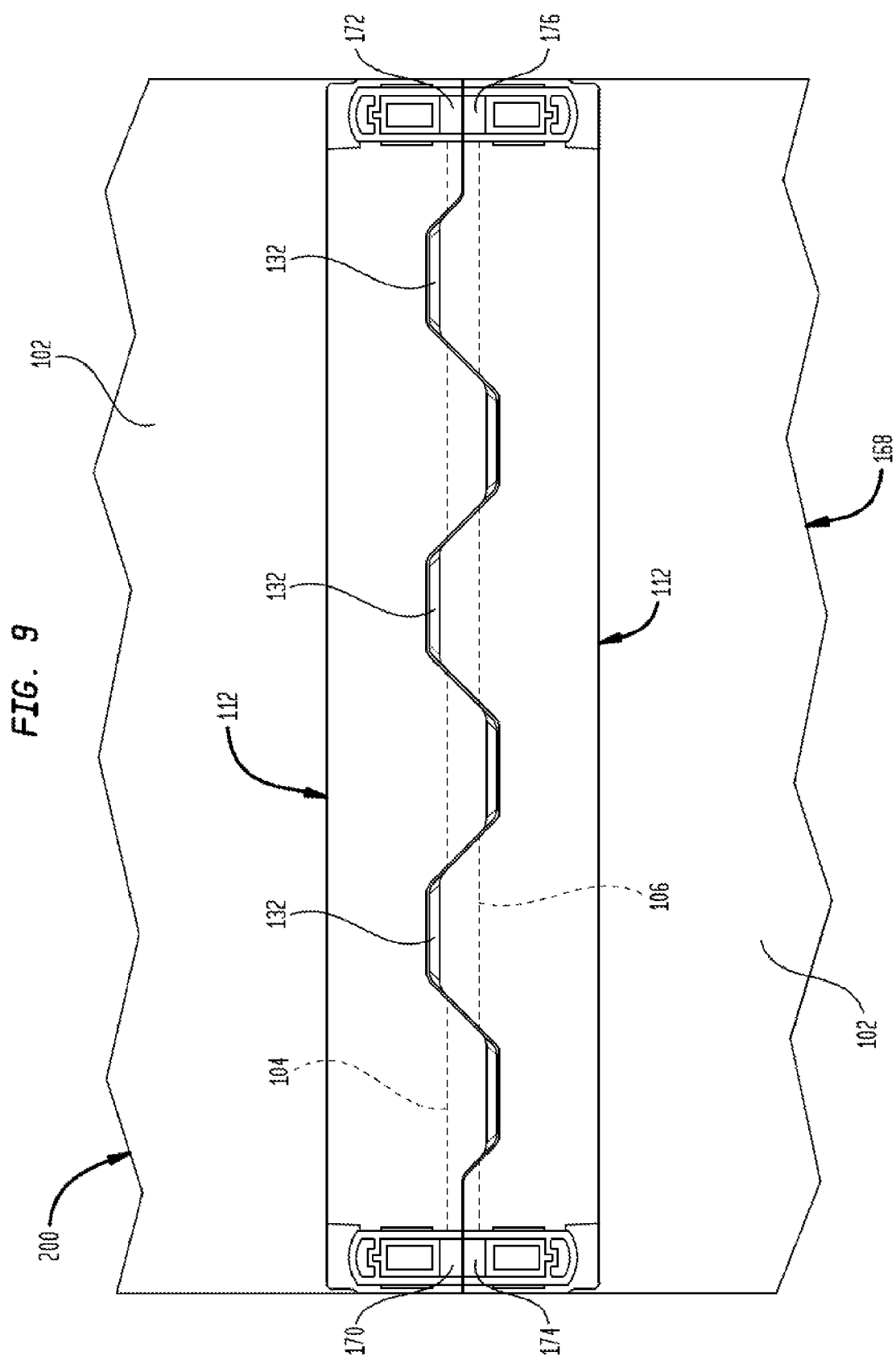

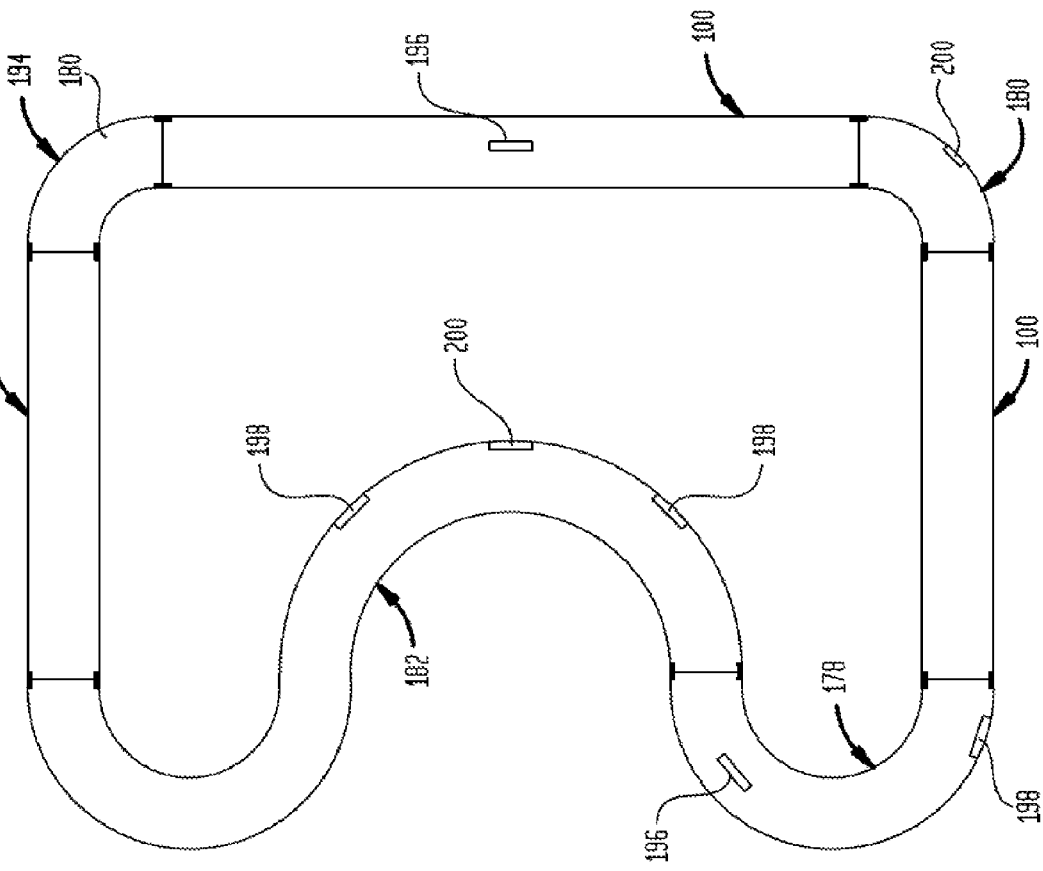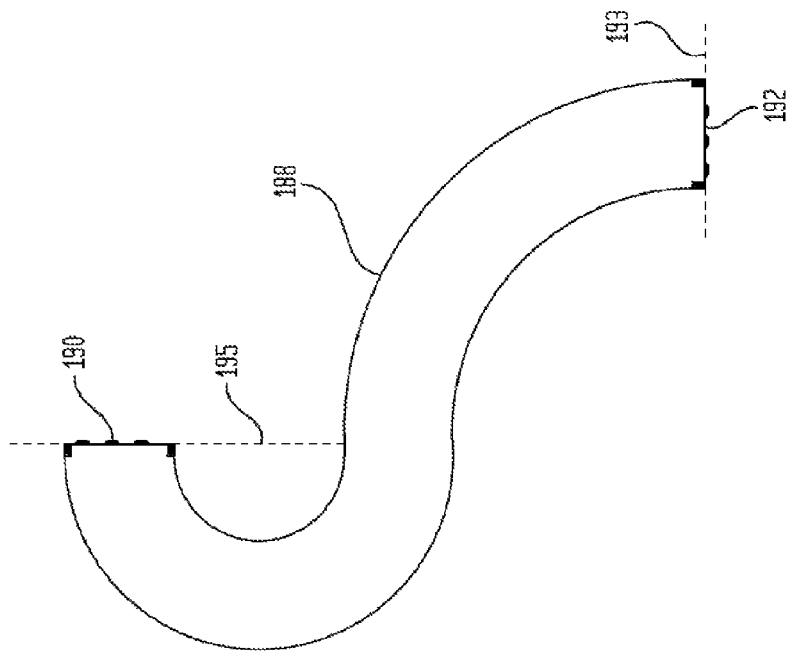

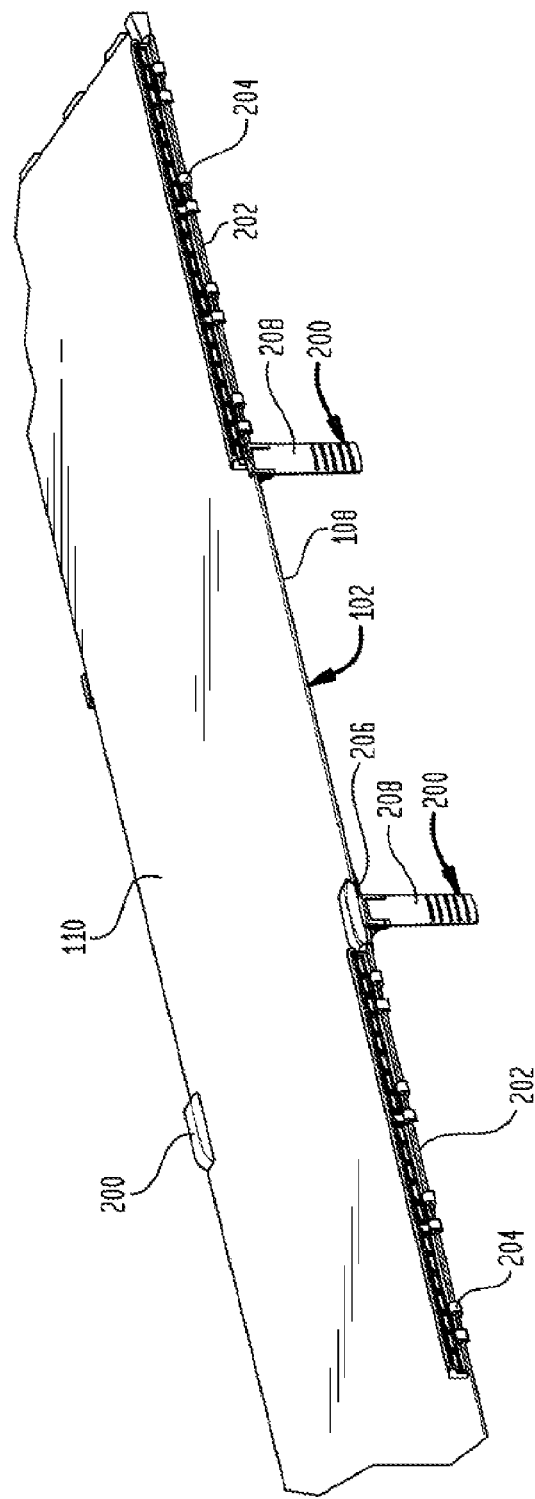
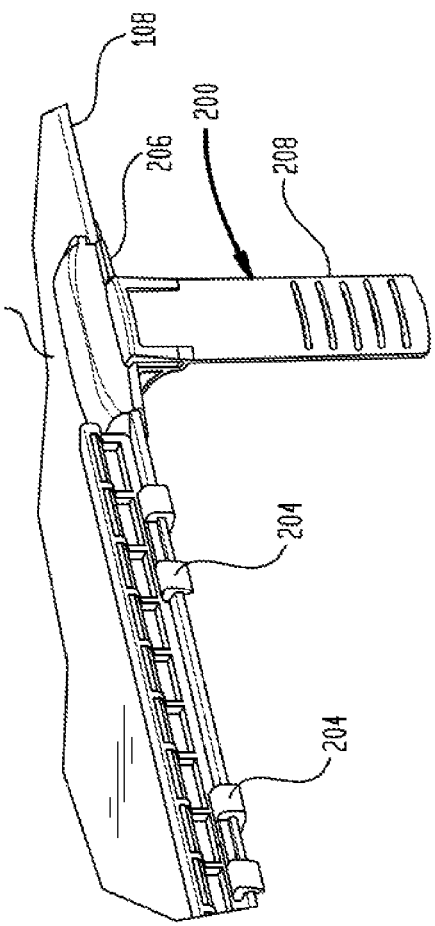

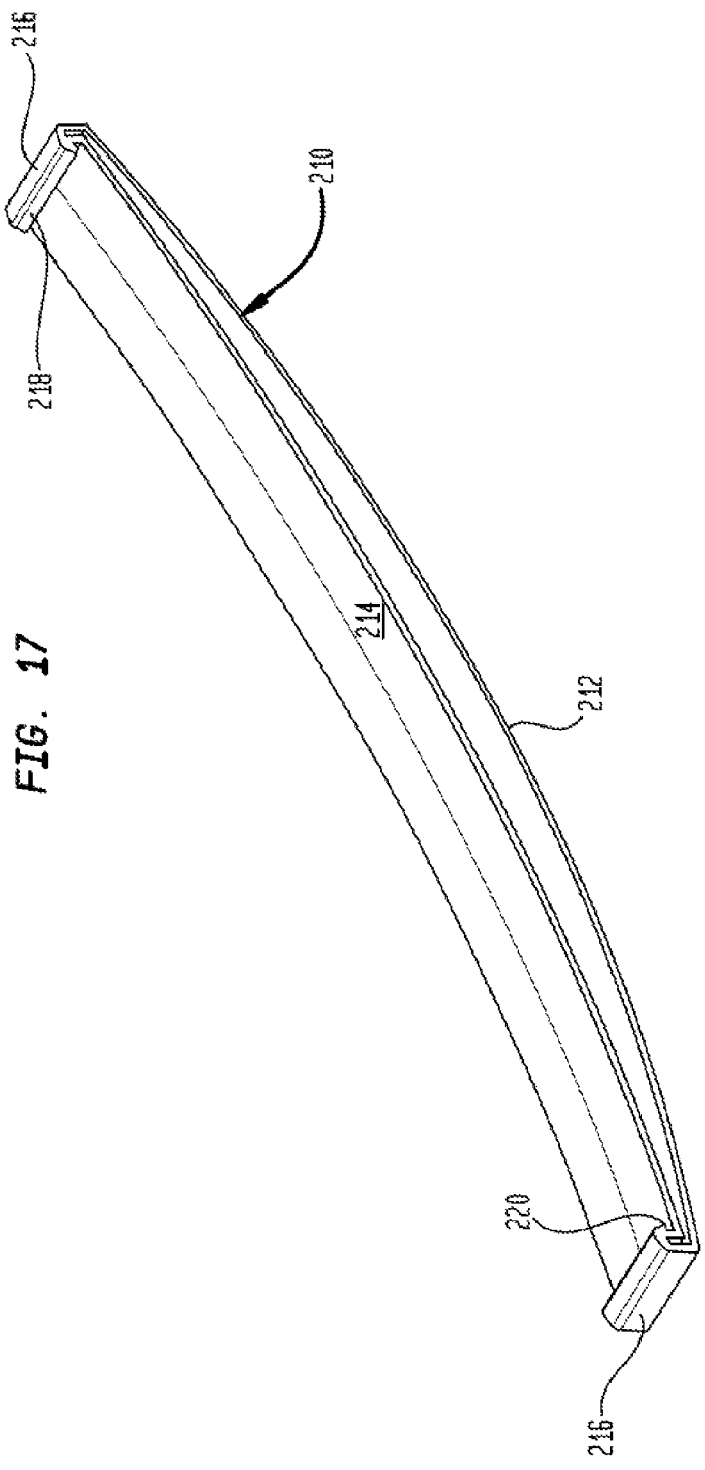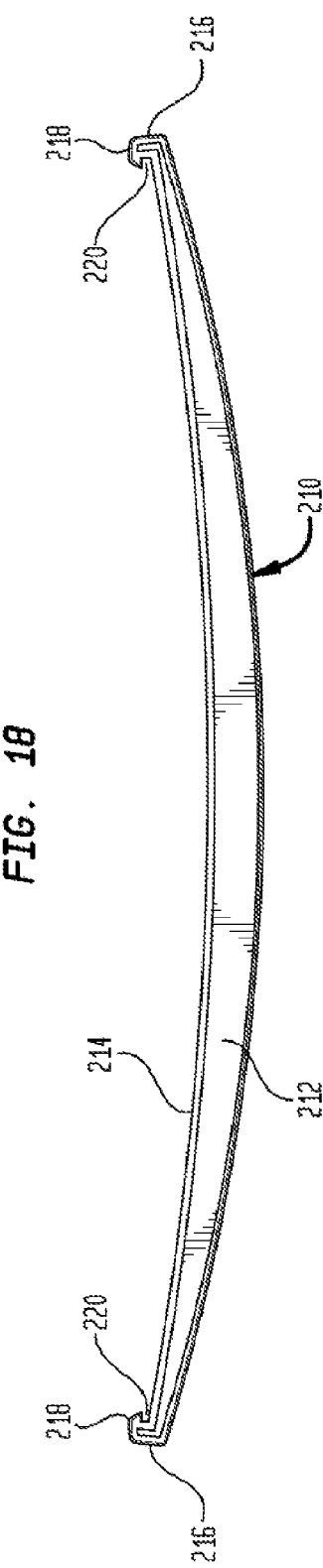

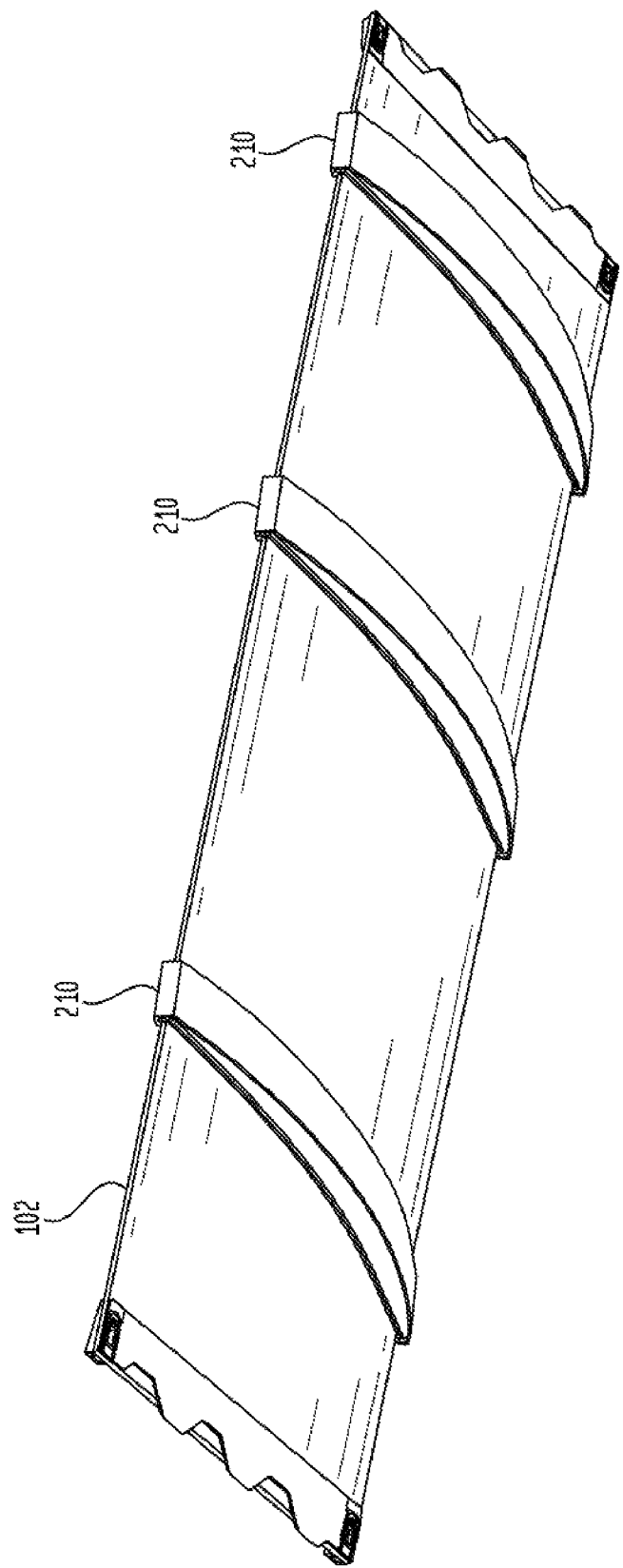

SUPPORT SYSTEM FOR AUTONOMOUSLY CONTROLLED MOBILE DEVICES

BACKGROUND OF THE INVENTION

The present disclosure relates in general to robotic systems capable of being integrated with mobile computing devices such as smart phones and/or tablets for controlling the operation of mobile devices such as self-powered vehicles. More specifically, the present disclosure relates to interconnectable supports to provide a platform for supporting the mobile devices upon movement thereof in a plurality of directions by a mobile computing device.

Many electronic toys are controlled by a human operator. Examples include radio and remote control cars and model trains which are controlled through a hand held device. These remotely controlled mobile devices are typically supported by a system of user connectable tracks which may be laid out in different configurations. For example, conventional slot car tracks typically rely on passive friction fit connections, though a variety of connection types exists. With friction fits, tabs at the joining ends of the tracks will slide into matching sockets and the tracks remain together based on the tightness of their fit. Some track designs employ connector pieces and others interlock like puzzle pieces. Hardcore enthusiasts will often mill their tracks from sheet material with a CNC machine, so-called routed tracks. The routing of large pieces for track provides a more consistent surface which reduces the clacking noise of cars passing over the joints between connected tracks.

While there may be as many approaches to joining toy vehicle tracks as there are varieties of toy vehicles that operate on a track, the majority of these are rigid tracks, and most, if not all, are narrow with respect to the width of the vehicle. Part of this is likely due to the nonlinear manner in which the costs of the injection-molded parts increase with size and; part of this can be attributed to the ease with which one can grip a narrow piece of track with a single hand, and then join two together by holding one in each hand. This is less of an issue with tracks that interlock with mating puzzle piece connections in which tracks may be laid out by a primarily vertical motion of connection, rather than horizontally plugging one piece into another. Nonetheless, in each case, some level of attention is required to assure correct connection.

BRIEF SUMMARY OF THE INVENTION

The primary connection mechanism of the embodiments of the present disclosure relies on magnetic attraction force. The use of high-force magnets creates a condition in which magnets will actively connect when positioned within relatively close proximity of each other. The interconnecting pieces are designed adopting this magnet force attraction. In additional embodiments, interlocking coupling members that may be tapered both horizontally and vertically from base to tip may be incorporated such that when they are pulled together by the magnetic force their geometries assure proper alignment.

A support in one embodiment for a mobile device is described comprising a flexible body having spaced apart first and second ends; a first coupling element attached adjacent the first end and the second end of the body; a second coupling element attached adjacent the first end and the second end of the body in spaced apart relationship to the first coupling element; wherein the first and second coupling elements are adapted to be releasably coupled to an opposing coupling element of another support when arranged adjacent thereto by a magnetic attraction force created therebetween.

The first coupling element comprises a first magnetic field creating element having a first magnetically polarized orientation, and wherein the second coupling element comprises a second magnetic field creating element having a second magnetically polarized orientation opposite the first magnetically polarized orientation; or the first coupling element comprises a magnetic field creating element, wherein the second coupling element comprises an attractive element responsive to a magnetic field created by the magnetic field creating element.

The support may further include a coupling member attached to the first end and the second end of the body, the coupling member having a plurality of spaced apart outwardly projecting members configured to interdigitate with projecting members on another support.

A support for a mobile device is described in another embodiment comprising a flexible polymer body having spaced apart first and second opposite ends; a first rare earth magnet attached adjacent the first end and the second end of the body for creating a magnetic field, the first magnet having a first magnetically polarized orientation; a second rare earth magnet attached adjacent the first end and the second end of the body in spaced apart relationship to the first rare earth magnet for creating a magnetic field, the second magnet having a second magnetically polarized orientation opposite the first magnetically polarized orientation; and a coupling member attached to the first end and the second end of the body having at least one outwardly projecting member.

The body may be selected from the material group consisting of HIPS, ABS, HDPE and PC; the body may have a planar geometry having a thickness in the range of 0.5 mm-2 mm; and the first and second rare earth magnets are selected from the group consisting of samarium-cobalt and neodymium-iron-boron.

A method for assembling a plurality of supports for a mobile device is described in accordance with another embodiment comprising arranging a plurality of flexible supports in end to end relationship, each of the supports comprising a flexible body having spaced apart first and second ends, a first coupling element attached adjacent the first end and the second end of the body, and a second coupling element attached adjacent the first end and the second end of the body in spaced apart relationship to the first coupling element; and releasably coupling the first and second coupling elements to an opposing coupling element of another support by a magnetic attraction force created therebetween.

The first coupling element comprises a first magnetic field creating element having a first magnetically polarized orientation; and wherein the second coupling element comprises a second magnetic field creating element having a second magnetically polarized orientation opposite the first magnetically polarized orientation.

A support for a mobile device is described in accordance with another embodiment comprising a flexible body having spaced apart first and second ends; a magnetic coupling element attached adjacent the first end and the second end of the body; a coupling member attached to the first end and the second end of the body, the coupling member having a plurality of spaced apart outwardly projecting members; and wherein the magnetic coupling element is adapted to be releasably coupled to an opposing magnetic coupling element of another support by a magnetic attraction created therebetween with the plurality of projecting members of one support being received interdigitated with a plurality of projecting members of another support.

A system operative with a mobile computing device is described in accordance with another embodiment comprising at least one mobile device operative by a mobile computing device for controlled movement in a plurality of directions; a plurality of flexible bodies having spaced apart first and second ends, said plurality of bodies constructed to support the mobile device upon movement of the mobile device in the plurality of directions; a first coupling element attached adjacent the first end and the second end of the bodies; a second coupling element attached adjacent the first end and the second end of the bodies in spaced apart relationship to the first coupling element; and wherein the first and second coupling elements are adapted to be releasably coupled to an opposing coupling element of another support when arranged adjacent thereto by a magnetic attraction force created therebetween.

BRIEF DESCRIPTION OF THE DRAWINGS

The accompanying drawings illustrate several embodiments of the disclosure and, together with the description, serve to explain the principles of the disclosure according to the various embodiments. One skilled in the art will recognize that the particular embodiments illustrated in the drawings are merely exemplary, and not intended to limit the scope of the disclosure.

FIG. 3 is a top plan view of a coupling assembly forming a component of the track as illustrated in FIG. 2.

FIG. 4A is a front elevational view of the coupling assembly, FIG. 4B is a rear elevational view thereof, and FIG. 4C is a right side view thereof.

FIG. 9 is a bottom plan view showing a pair of adjacent supports in assembled relationship using the magnetic field creating elements and coupling assembly.

FIG. 13 is a top plan view of a support constructed as a random circular segment in accordance with another embodiment of the present disclosure.

FIG. 14 is a top plan view of a system including a plurality of interconnected supports forming a continuous arrangement for supporting a mobile device upon movement of the device in a plurality of directions about the supports.

FIGS. 15 and 16 are perspective views illustrating accessories for use with the support system.

FIG. 17 is a perspective view of a track clasp in accordance with one embodiment which provides supplemental rigidity to the support.

FIG. 18 is a front elevational view of the track clasp.

FIG. 19 is a perspective view showing a plurality of track clasps being attached to a support.

DETAILED DESCRIPTION

Figure 1:
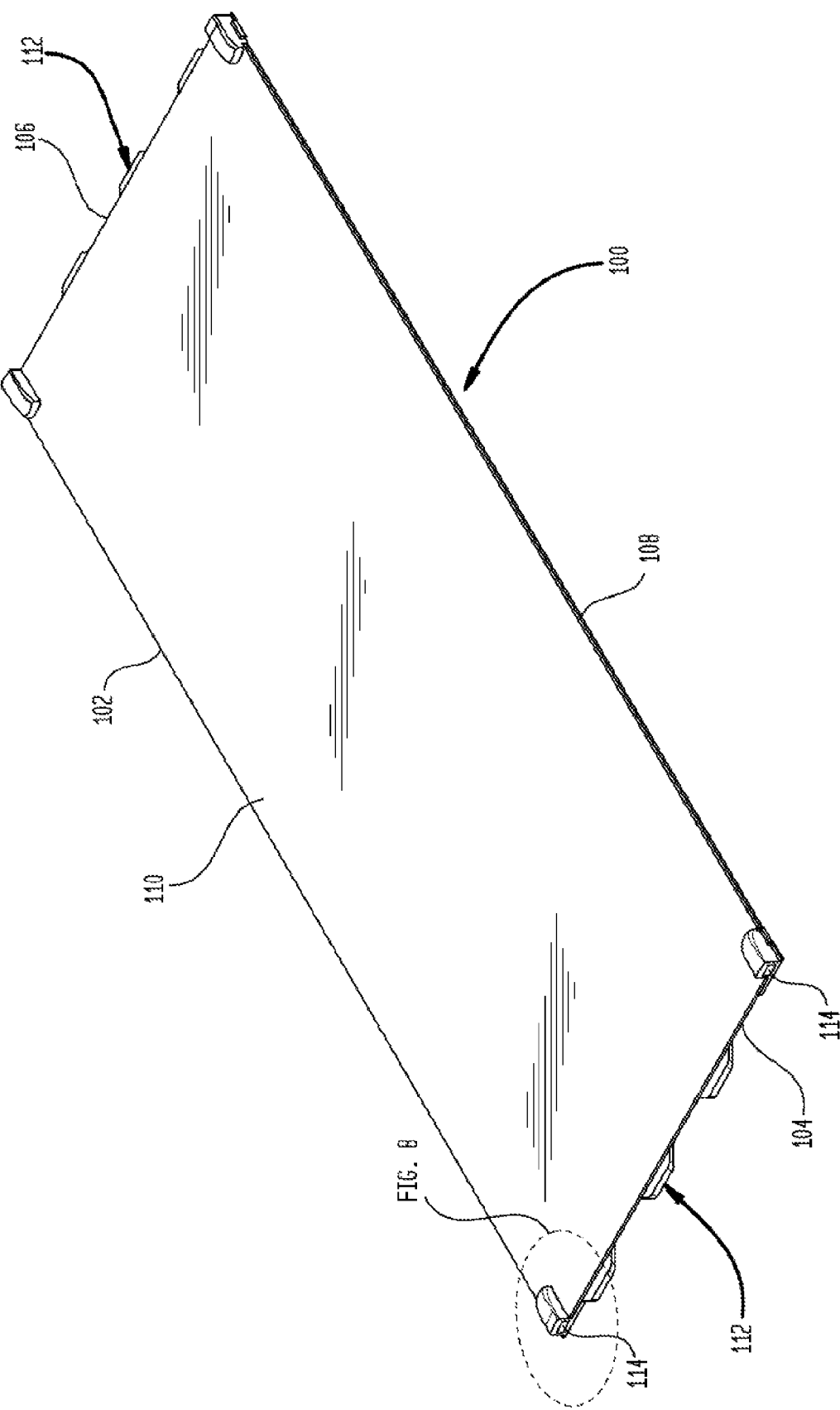
FIG. 1 is a perspective view of a support in the nature of a linear track segment adapted for use with controlled mobile devices in accordance with one embodiment of the present disclosure.

In describing the preferred embodiments as illustrated in the drawings, specific terminology will be used for the sake of clarity. However, the embodiments and the inventions included therein are not intended to be limited to the specific terms so used, and it is to be understood that each specific term includes all equivalents that operate in a similar manner to accomplish a similar purpose.

For illustrative purposes, the embodiments of the disclosure will be described herein primarily in the context of a system that implements a car racing game in which the mobile devices under user control are physical vehicles or accessories related to game play while competing on a physical track. Further details regarding the implementation of such a system and its mechanisms for integrating virtual and physical environments are set forth in U.S. Publication Nos. 2014/0342834 entitled "Mobile Agents For Manipulating, Moving, and/or Reorienting Components"; 2014/0235138 entitled "Distributed System of Autonomously Controlled Mobile Agents"; 2014/0235136 entitled "Distributed System of Autonomously Controlled Mobile Agents"; 2014/0017974 entitled "Distributed System of Autonomously Controlled Mobile Agents"; 2013/0324250 entitled "Integration of a Robotic System With One or More Mobile Computing Devices"; 2013/0095726 entitled "Distributed System of Autonomously Controlled Mobile Agents"; and 2010/0304640 entitled "Distributed System of Autonomously Controlled Toy Vehicles", the disclosures of which are incorporated herein by reference.

One skilled in the art will recognize that the embodiments, techniques and methods described herein can be implemented in other context and environments, and may not be limited to vehicles on a physical track. The term mobile device may also be used interchangeably with the term vehicle, and shall therefore be interpreted to extend to any movable device or agent that is capable of being controlled and operated in a manner as described in the aforementioned publications.

Although the embodiments are described herein primarily in the context of an application in entertainment, one or ordinary skill in the art would recognize that the embodiments and the inventions contained therein can be implemented in many other context, including a context that is not necessarily related to entertainment.

Referring to FIG. 1, there is illustrated a support 100 in the nature of a track adapted for supporting a mobile device, e.g., vehicles, while being manipulated thereon such as with the use of a mobile computing device, e.g., smart phones and/or tablets. The support 100 in accordance with one embodiment is formed from a rectangular planar sheet 102 having opposite spaced apart ends 104, 106 and lateral spaced apart side edges 108, 110. A coupling assembly 112 is attached to the ends 104, 106 of the support 100. As to be described in greater detail, the coupling assembly secures a pair of spaced apart coupling elements 114 which are arranged at the four corners of the support 100. The coupling assembly 112 with the coupling elements 114 is adapted to enable a plurality of supports 100 to be releasably interconnected to one another in end-to-end relationship to form a path for the mobile device.

Figure 2:
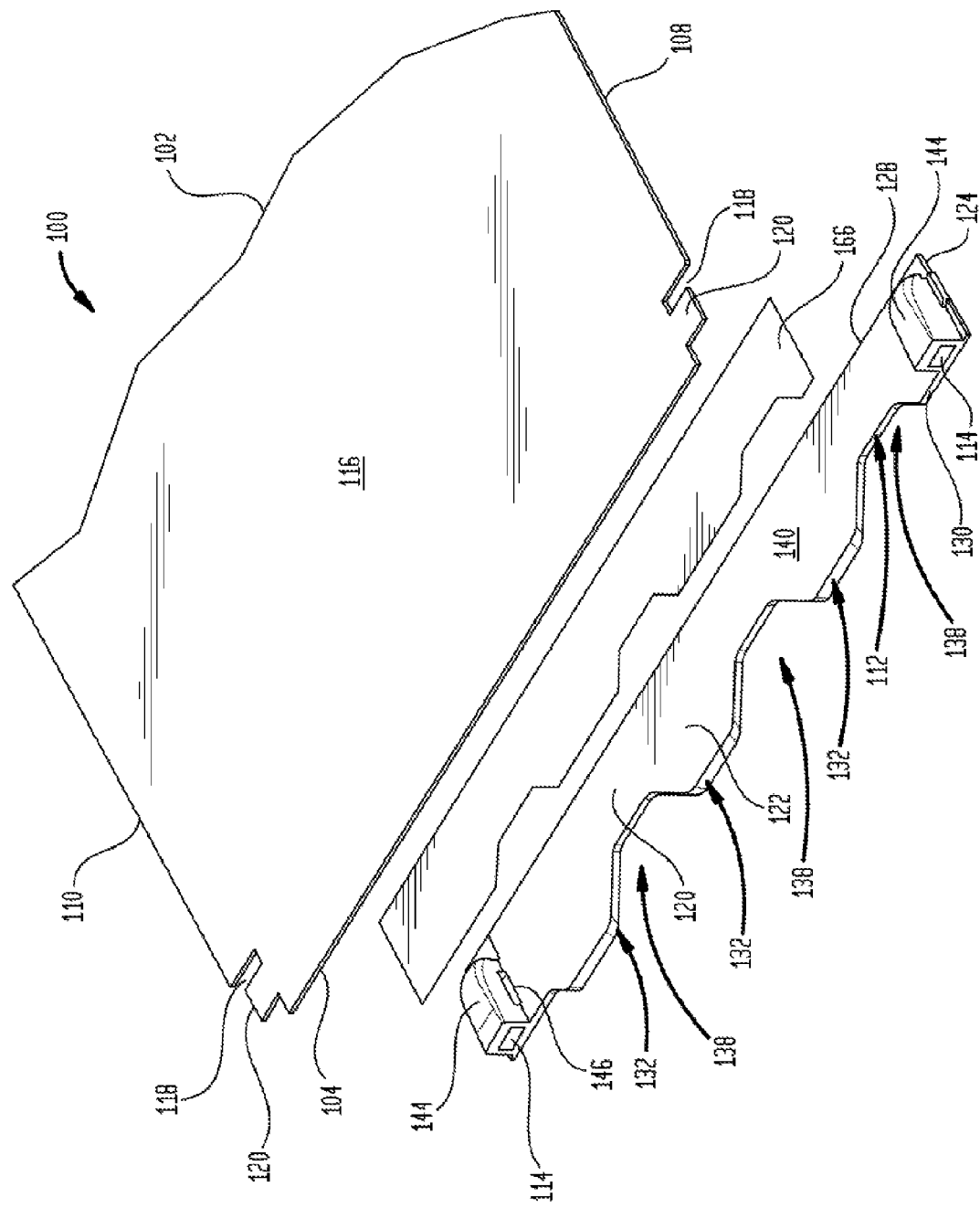
FIG. 2 is an exploded unassembled perspective view of the support in accordance with one embodiment as illustrated in FIG. 1.

Turning to FIG. 2, the sheet 102 in one embodiment may be a planar body having, for example, a flat surface 116. The sheet 102 along the side edges 108, 110 are provided with inwardly formed slots 118 which form tabs 120 adjacent the four corners of the sheet. The sheet 102 can be fabricated from a variety of flexible polymer materials. One of the advantages of a pliant sheet is its adaptability in a track layout to variations or discontinuities in the surface supporting the tracks. For example, these may include the inconvenience of a track section passing over an architectural feature like a door threshold or the result of a track layout that deliberately includes hills, loops or banks. The Flexural Modulus of the sheet 102 is adapted to balance the need to provide a firm surface in which the mobile devices can operate and one that accommodates defamations as may be required by the track layout.

By way of example, too much flexibility in the sheet 102 may result in the surface being too weak to support the moving mobile devices or defamations may allow for excessively large curvatures to form within short track sections rather than distributing the distortion across a longer distance, potentially across more than one track section. In the preferred embodiment, curves resulting from shaping the sheet 102 should provide a continuously smooth surface even across the coupling assemblies 112 of adjacent supports 100. Suitable materials for the construction of the sheet 102 may include, for example, high impact polystyrene (HIPS), acrylonitrile butadiene styrene (ABS), polycarbonate (PC), and optionally high density polyethylene (HDEP). It is to be understood that the sheet 102 can be formed form other polymer materials which meet the requirements for forming tracks in accordance with the various embodiments as understood from the present disclosure.

The thickness of the sheet 102 will also affect its flexibility and rigidity, depending upon the material selected and the Flexible Modulus. By way of example, sheets 102 of HIPS polymers having a thickness in a range of 0.5 mm to 2 mm are within the scope of the preferred embodiments, and preferably 1.0 mm. However, it is to be understood that other thicknesses for the sheet 102 of polymer materials are also within the scope of the embodiments which will provide the required flexibility and strength as understood from the present disclosure.

The sheet 102 may have any desired width between the side edges 108, 110 in order to accommodate a plurality of mobile devices in side-by-side or other relationship. By way of one example, the sheet 102 may have a width of about 220 mm which may accommodate four mobile devices at the same time. However, the sheet 102 can be designed of smaller width if desired, or being significantly greater in width to accommodate more mobile devices at the same time during game play.

Referring to FIGS. 2-4A and 4B, the coupling assembly 112 in one embodiment includes an elongated flat coupling member 122 having spaced apart ends 124, 126 and spaced apart lateral side edges 128, 130. Side edge 130 may form a plurality of spaced apart projecting members 132 formed by tapered side walls 134 and a sloped leading edge 136. The projecting members 132 are in the nature of trapezoids forming trapezoid shaped openings 138 therebetween. As a result of this construction of the projecting members 132 and openings 138, the projecting members on opposing coupling assemblies 112 may be interdigitated within one another when assembling the supports 100. As will be apparent from the description, the projecting members 132 and openings 138 may have other shapes to allow their interdigitation to effect coupling of the supports 100, for example, triangular, square and the like.

Figure 5:
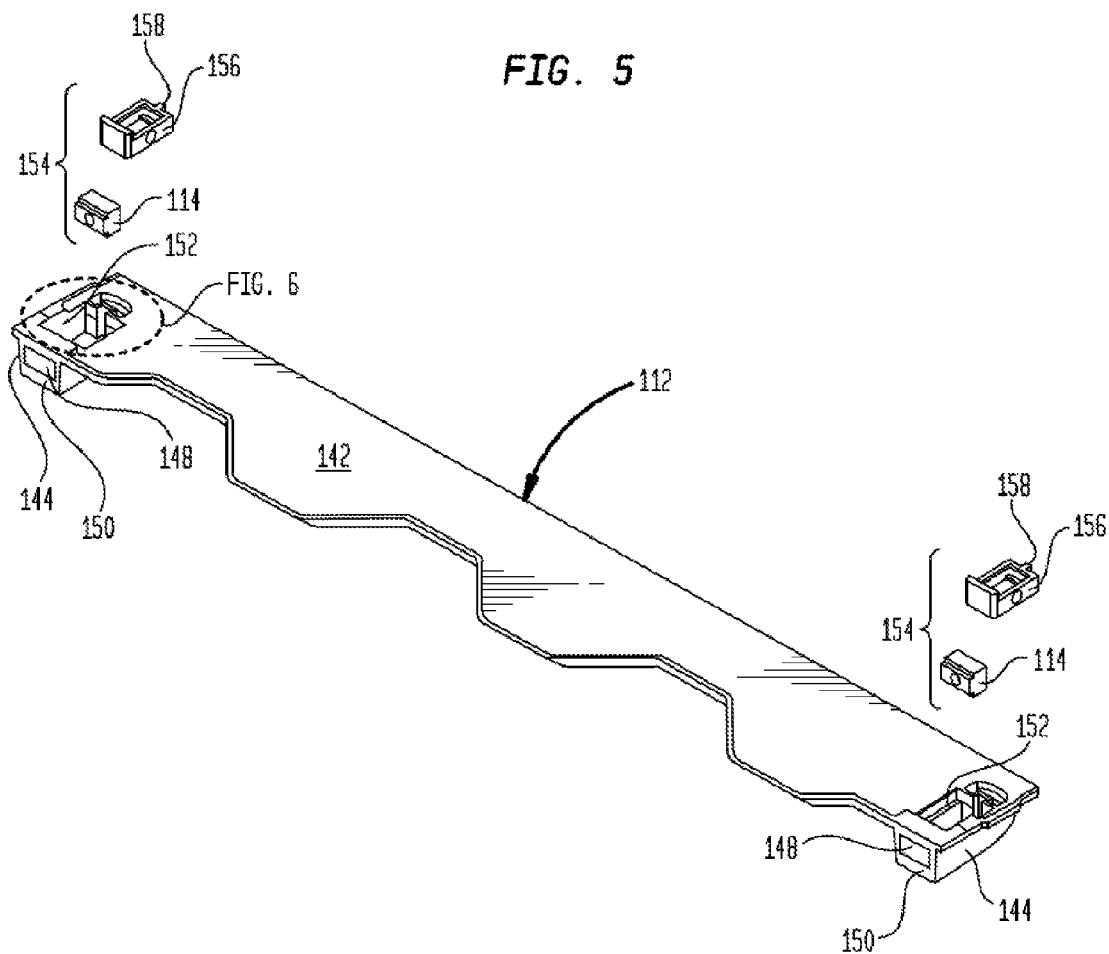
FIG. 5 is a perspective view, looking from below, of the coupling assembly having a coupling element assembly including magnetic field creating elements shown in unassembled relationship.

As best shown in FIGS. 2, 4C and 5-7, the coupling member 122 includes a top surface 140 and a bottom surface 142. A coupling element housing 144 may be provided extending upwardly from the top surface 140 adjacent each end of the coupling member 122. As shown in FIG. 2, the housing 144 is provided with an elongated slot 146 inwardly facing overlying the top surface 140 of the coupling member 122. An opening 148, see FIG. 5, is provided in the face 150 of the housing 144. The slot 146 and opening 148 communicate with the interior of the housing 144. To be explained hereinafter, the slot 146 is adapted to receive the tab 120 of the sheet 102 during assembly of the support 100.

Figure 6:
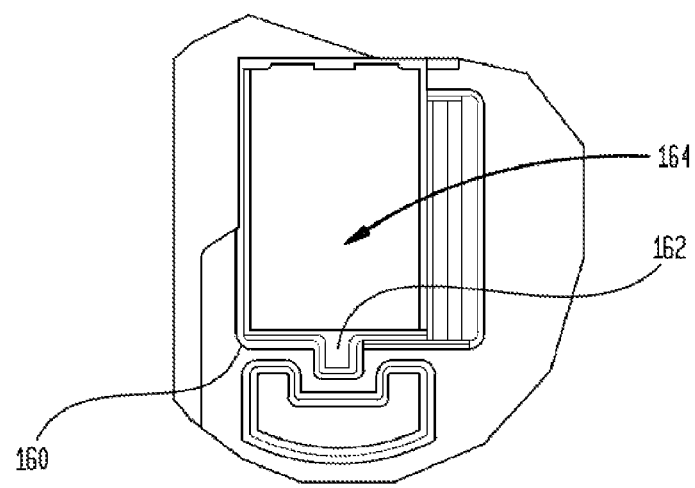
FIG. 6 is an enlarged plan view of a portion of the coupling assembly for receiving the coupling element assembly including the magnetic field creating elements.
Figure 7:
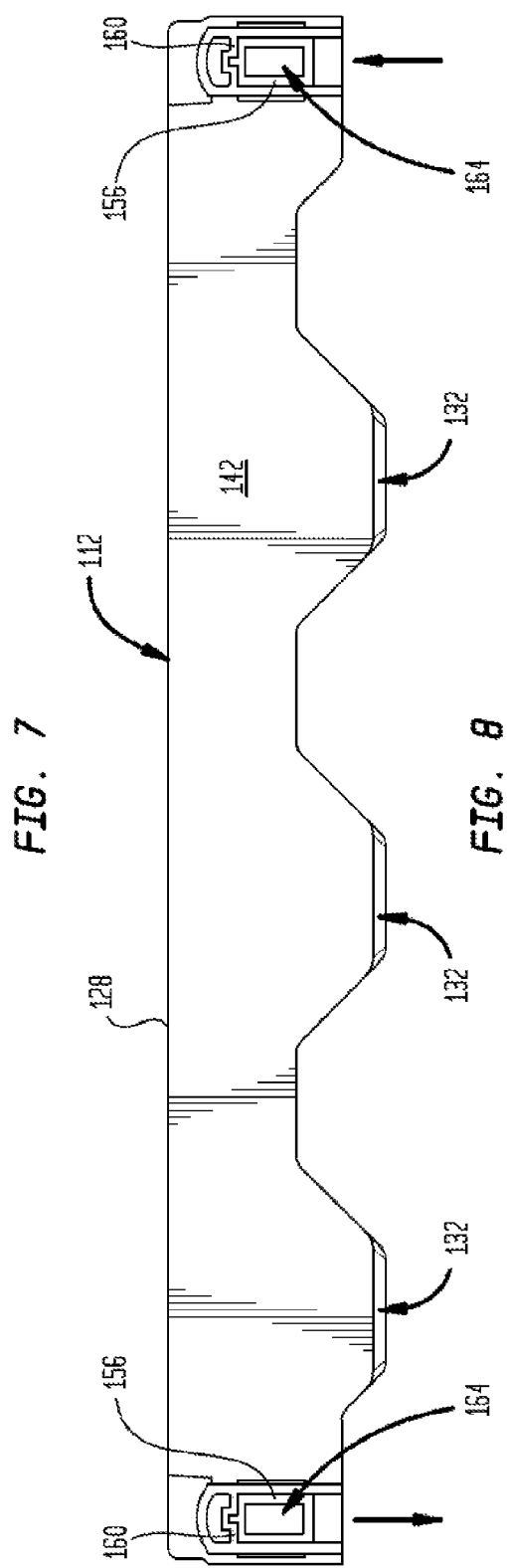
FIG. 7 is a bottom plan view of the coupling assembly showing the magnetic field creating elements assembled therewith and arranged with opposite magnetic polarization.

With reference to FIGS. 5-7, the interior of the housing 144 forms a cavity 152 for receiving a coupling element assembly 154. The coupling element assembly 154 includes the coupling element 114 and may include a coupling element retainer 156. The retainer 156 in the embodiment illustrated is in the form of an open box having an elongated tab 158 projecting outwardly from one face of the retainer. The cavity 152, see FIG. 6, is bifurcated by a wall 160 having an elongated slot 162 formed therein facing a retainer receiving cavity 164. The retainer receiving cavity 164 is shaped and sized to receive the coupling element retainer 156 with the tab 158 engaged within the slot 162 as best shown in FIG. 7.

The coupling element assembly 154 is secured within the cavity 152 within the housing 144. Initially, a coupling element 114 is positioned within the cavity 152 against the face wall 150 exposing a portion of the coupling element through the opening 148. The coupling element retainer 156 is inserted into the retainer receiving cavity 164 in general abutment with the coupling element 114 and having its tab 158 received within the slot 162 formed within the wall 160. The coupling element retainer 156 can be secured within the cavity 164 by any suitable means, for example, ultrasonic welding, adhesive bonding, friction fit and the like. It is to be understood that other assemblies are contemplated for securing the coupling element 114 within the housing 144 of the coupling assembly 112. The coupling assembly 112 and coupling element retainer 154 may be formed from any suitable polymer material.

The coupling elements 114 may be in the nature of magnetic field creating devices known as magnets. There are known a variety of magnets that would be suitable for use as a coupling element 114 for the supports 100. Suitable magnets for use as a magnetic field creating element may include ferromagnets or rare-earth magnets. In the preferred embodiment, the coupling elements 114 are rare-earth magnets, and preferably neodymium-iron-boron magnets, however samarium-cobalt magnets are also contemplated for use as the coupling elements 114. Rare-earth magnets have the advantage of being compact, high-strength magnets which create a very strong magnetic field.

Figure 8:
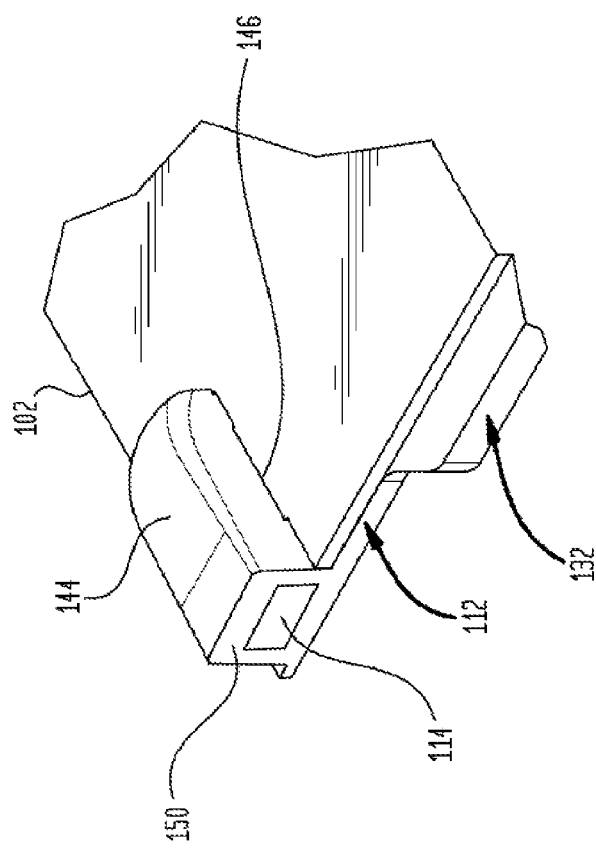
FIG. 8 is a partial perspective view showing a portion of the assembled support illustrated within the circle in FIG. 2.

The support 100 may be assembled in the manner as illustrated in FIGS. 2 and 8 in accordance with one embodiment. The coupling assembly 112 is arranged underlying and adjacent each end 104, 106 of the sheet 102. A piece of double sided adhesive tape 166 may be adhered to the top surface 140 of the coupling member 122. The adhesive tape 166 can be die cut to match the configuration of the coupling member 122, including the projecting members 132 and openings 138. The coupling assembly 112 is bonded to the bottom surface of the sheet 102 using the adhesive tape 166 with the tabs 120 being inserted into the slots 146 within the housings 144 of the coupling assembly 112. Although the embodiment has been described with respect to the use of a double sided adhesive tape 166, the use of such tape is optional. In this regard, other bonding techniques may be used for attaching the coupling assembly 112 to the sheet 102. For example, thermal bonding, solvent adhesives depending upon material composition of the sheet 102 and coupling assembly 112, screen printed contact adhesives on the top surface 140 of the coupling assembly, and the like. Once bonded as shown in FIGS. 1 and 8, the projecting members 132 extend outwardly beyond the edges 104, 106 of the sheet 102 forming the support 100.

Adjacent supports 100 may be releasably interconnected to form a track layout using magnetic attraction between opposing coupling elements 114. In accordance with the preferred embodiment as shown in FIG. 9, support 102 includes a pair of rare-earth magnets 170, 172 oriented within the coupling element housing 144 having a portion exposed within the opening 148. The rare-earth magnets 170, 172 are oriented with opposite poles facing outwardly towards an adjacent support 100. For example, magnet 170 may have its south pole exposed through the opening 148, while magnet 172 may have its north pole exposed through opening 148. Opposing magnet 174 in an adjacent support 100 will have its north pole exposed through opening 148, while magnet 176 will have its south pole exposed through opening 148. When the coupling assemblies 112 are arranged adjacent each other, a magnetic attraction force will be created between the opposing poles of the magnets, i.e., magnet pairs 170 and 174 and magnet pairs 172, 176. The magnetic attraction force will pull the two adjacent supports 100, 168 towards one another. The supports 100, 168 when pulled together by the magnetic attraction force are self-aligned by the projecting members 132 extending into the opposing openings 138. As shown, a portion of the projecting members 132 extend underlying a portion of the sheet 102 of an adjacent support 100, 168. This provides load bearing support at the seam created between the ends 104, 106 of the supports 100. The north/south pole orientation of the magnet pairs 170, 174 and 172, 176 enable the strong, but releasable, coupling of adjacent supports 100, 168.

In accordance with another embodiment, it is contemplated that it is not required that pairs of magnets be used having opposite polarity as thus far described. In this regard, one of the magnets can be replaced by a body of magnetizable material, such as iron, which will be attracted to either the north or south pole of the opposing magnet. For example, magnets 170 and 176 in the thus described embodiment can be replaced with of body of iron material which will be magnetically attracted to the north and south poles of magnets 174 and 172.

To enable the adjacent supports 100, 168 to be magnetically attached in various configurations, the north and south pole orientation of the magnets along one end 104 of the support is the opposite to the north/south pole orientation of the magnets at the other end 106 of the support. In this way, either end of a support 100, 168 can be connected to either end of another support without regard to the pole orientation of the magnets.

Figure 12:
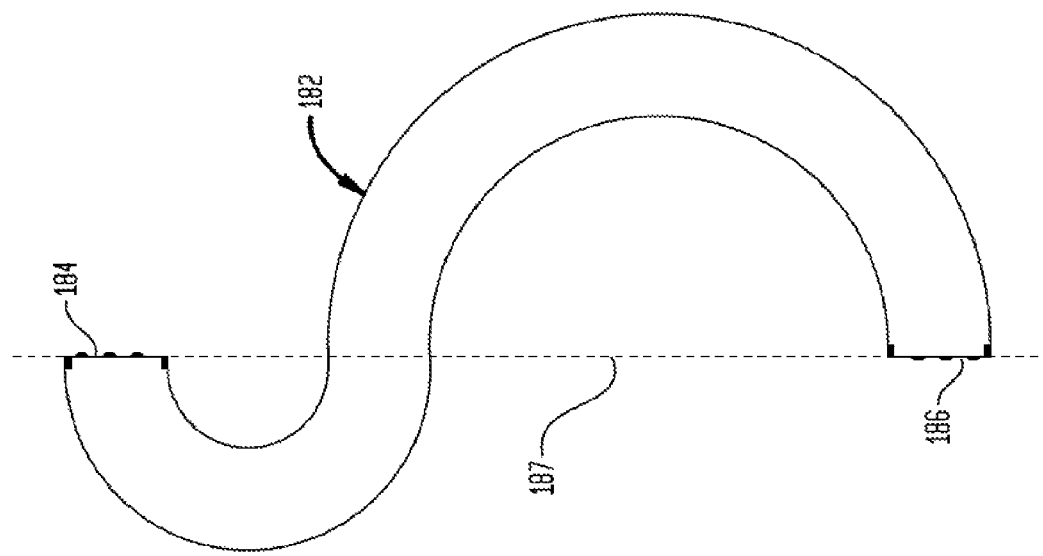
FIG. 12 is a top plan view of a support constructed having an s-shaped configuration in accordance with another embodiment of the present disclosure.
Figure 11:
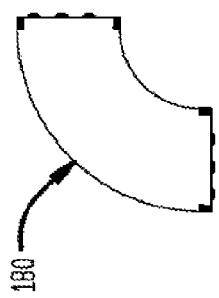
FIG. 11 is a top plan view of a support constructed as a 90 degree circular segment in accordance with another embodiment of the present disclosure.
Figure 10:
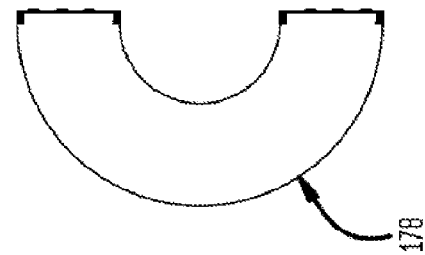
FIG. 10 is a top plan view of a support constructed having a u-shaped configuration in accordance with one embodiment of the present disclosure.
Figure 20:
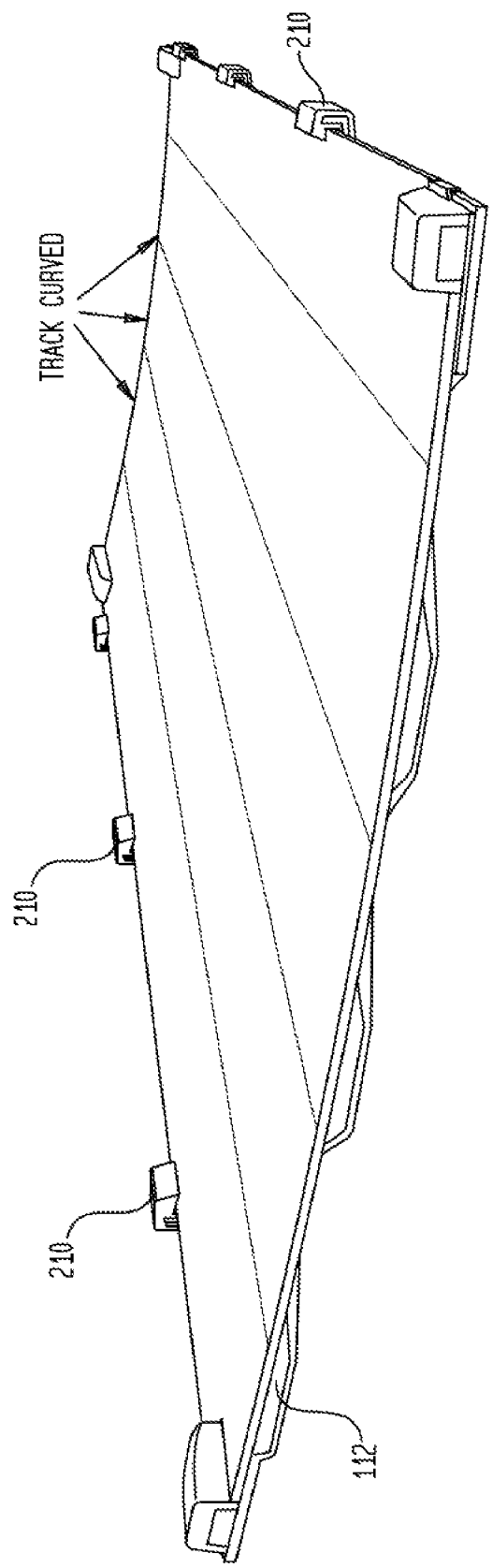
FIG. 20 is a perspective view showing the plurality of track clasps affecting the curvature of the support in longitudinal direction.

The supports 100 have been described as having a rectangular shape allowing for linear movement of a mobile device from one end 104 to another end 106. In order to form a circuitous, discontinuous or other track layout, it is desirable to have supports that are non-rectangular. It is contemplated that other geometric shapes for the supports 100 can be used in building a layout for a mobile device. For example, as shown in FIG. 10, a support 178 has a u-shape, e.g., a 180 degree circular segment. As shown in FIG. 11, the support 180 has a partial circular shape formed as a 90 degree segment of a circle. Referring to FIG. 12, the support 182 has an s-shape with its opposite ends 184, 186 aligned along a common axis 187. The support 188 as shown in FIG. 13 is a random curved shape somewhat in the form of a question mark having ends 190, 192 arranged along perpendicular axis 193, 195. As will be understood to those skilled in the art, these are only exemplary embodiments of the various shapes for a support 100 that can be constructed in accordance with the various embodiments of the present disclosure.

As shown in FIG. 14, a plurality of supports has been interconnected to form a circuitous track layout 194 for use with a mobile devices 196 such toy vehicles. Other track layouts are also contemplated, such as discontinuous layouts have dead ends, etc. Although the track layout 194 is shown in plan view as a planar layout, it is to be understood that the track layout may have undulations and different elevations, as well as banked arranged supports 180 as thus far described as a result of the flexibility of the supports and interconnection system as described with respect to the various embodiments of the disclosure. The mobile devices 196 can be autonomously manipulated along the track layout 194 using a mobile computing device such as a smart phone and/or tablet as described in the aforementioned patent publications which have been incorporated herein by reference.

Referring to FIGS. 15 and 16, the support system may include a plurality of accessories that can be used with the track layout 194 as shown in FIG. 14. By way of examples, these accessories may include guard rails 198 and elevation members 200 that can be releasably clipped on the side edges 108, 110 of the sheet 102. The guard rails 198 facilitate maintaining the mobile devices 196 on the support 100 at locations along the track layout 194 where the mobile device would be prone to leaving the track during game play. The elevation members 200 may be used to elevate portions of the track such as creating hills and banks to enhance game play.

The guard rails 198 include an elongated wall 202 having one or more clips 204 which may be spaced apart along the bottom edge of the wall. The clips 204 enable the releasable attachment of the guard rails 198 to the lateral side edges 108, 110 of the sheet 102. The clips may be configured in any form, for example, resilient u-shape members forming an opening adapted to receive a portion of the sheet 102 by friction fit. Other configurations of the clip 204 are contemplated, such as releasable adhesives, mating in connectors, and the like.

The elevation members 200 also include a clip 206 configured to releasably attached the elevation members to one of the side edges 108, 110 of the sheet 102. The clips 206 may be similarly constructed like clips 204. Releasably attached to each clip 206 is a post 208 which raises the support 100 to a predetermined elevation based upon the length of the post. Although the accessories have been described with respect to guard rails 198 and elevation members 200, it is to be understood that other accessories that would be useful for the support system are contemplated within the scope of the preferred embodiments.

Referring to FIGS. 17-20, there will now be described an optional accessory for the support 100 in the nature of a track clasp 210. The clasp 210 is constructed as an elongated body 212 of any desired width which may have a curved upper surface 214 which may be formed by a radius. The ends of the clasp 210 are defined by a body 216 which may have a lip 218 projecting inwardly over the curved surface 214 to define an opening 220 therebetween.

The linear dimension or distance between the openings 220 is slightly less than the linear width dimension of the sheet 102 between the lateral side edges 108, 110. This is more clearly shown in FIGS. 19 and 20. In this regard, the lateral edges 108, 110 of the sheet 102 can be inserted within the opposing openings 220 of a clasp 210. This causes the sheet 102 to bow downwardly generally into surface contact with the curved surface 214 of the clasp 210. This can be accomplished by squeezing together the lateral edges of the sheet 102 as the sheet is inserted into the clasp 210. The bowing of the sheet 102 causes the sheet to alter its cross-sectional moment thereby increasing its stiffness. The increased stiffness may be particularly helpful in the case where long linear lengths of track are used, or where sections of the track are desired to have increased stiffness. Any number of clasps 210 may be used on a given support 100.

Although the inventions herein have been described with reference to particular embodiments and accessories, it is to be understood that these embodiments and accessories are merely illustrative of the principles and applications of the present embodiments. It is therefore to be understood that numerous modifications may be made to the illustrative embodiments and accessories and that other arrangements may be devised without departing from the spirit and scope of the present invention as defined by the appended claims.

The invention claimed is:

1. A support for a mobile device comprising:
a body having spaced apart first and second ends;
a first magnetic coupling element attached adjacent the first end and the second end of the body;
a second magnetic coupling element attached adjacent the first end and the second end of the body in spaced apart relationship to the first coupling element; and
a first coupling member arranged adjacent to the first end and a second coupling member arranged adjacent to the second end of the body, wherein the first and second coupling members each include a plurality of outwardly projecting members configured to interdigitate with projecting members on another support, the plurality of projecting members adapted to support the first and second ends of a body of another support,
wherein the first and second coupling elements are adapted to be releasably coupled to an opposing coupling element of another support when arranged adjacent thereto by a magnetic attraction force created therebetween.

2. The support of claim 1, wherein the first coupling element comprises a first magnetic field creating element having a first magnetically polarized orientation; and
wherein the second coupling element comprises a second magnetic field creating element having a second magnetically polarized orientation opposite the first magnetically polarized orientation.

3. The support of claim 2, wherein the first and second magnetic field creating elements are selected from the group consisting of ferromagnetic magnets and rare earth magnets.

4. The support of claim 1, wherein the first coupling element comprises a magnetic field creating element; and
wherein the second coupling element comprises an attractive element responsive to a magnetic field created by the magnetic field creating element.

5. The support of claim 4, wherein the magnetic field creating element is selected from the group consisting of ferromagnetic magnets and rare earth magnets.

6. The support of claim 1, wherein the body has a thickness in the range of 0.5 mm-2 mm.

7. The support of claim 1 wherein the body is selected from the material group consisting of HIPS, ABS, HDPE, and PC.

8. The support of claim 1, wherein the projecting members include a sloped leading edge and tapered sidewalls.

9. The support of claim 8, further including a housing receiving the first and second coupling elements, wherein the housing includes a slot.

10. The support of claim 9, wherein the housing defines a cavity for receiving the first and second coupling elements.

11. The support of claim 10, wherein the body includes a tab extending into the slot at least partially obstructing the cavity.

12. A support for a mobile device comprising:
a polymer body having spaced apart first and second opposite ends;
a first rare earth magnet attached adjacent the first end and the second end of the body for creating a magnetic field, the first magnet having a first magnetically polarized orientation;
a second rare earth magnet attached adjacent the first end and the second end of the body in spaced apart relationship to the first rare earth magnet for creating a magnetic field, the second magnet having a second magnetically polarized orientation opposite the first magnetically polarized orientation; and
a first coupling member attached underlying the first end of the body and a second coupling member attached underlying the second end of the body, wherein the first and second coupling members each include a plurality of outwardly projecting members configured to interdigitate with projecting members on another support, wherein the coupling members are configured to extend underlying first and second ends of a body of another support.

13. The support of claim 12, wherein the body is selected from the material group consisting of HIPS, ABS, HDPE, and PC.

14. The support of claim 13, wherein the body has a planar geometry having a thickness in the range of 0.5 mm-2 mm.

15. The support of claim 12, wherein the first and second rare earth magnets are selected from the group consisting of samarium cobalt and neodymium iron boron.

16. A method for assembling a plurality of supports for a mobile device comprising:
arranging a plurality of flexible supports in end to end relationship, each of the supports comprising a flexible body having spaced apart first and second ends, wherein the first and second ends include a plurality of spaced apart projecting members, a first coupling element attached adjacent the first end and the second end of the body, and a second coupling element attached adjacent the first end and the second end of the body in spaced apart relationship to the first coupling element;

interdigitating the plurality of spaced apart projecting members of one support with a plurality of spaced apart projecting members of an adjacent support; and releasably coupling the first and second coupling elements to an opposing coupling element of another support by a magnetic attraction force created therebetween, wherein the first coupling element comprises a first magnetic field creating element having a first magnetically polarized orientation.

17. The method of claim 16, wherein the first and second magnetic field creating elements comprise rare earth magnets.

18. A support for a mobile device comprising:

a body having spaced apart first and second ends;

a magnetic coupling element attached adjacent the first end and the second end of the body; and a coupling member arranged adjacent to the first end and the second end of the body, the coupling member including a plurality of spaced apart outwardly projecting members configured to interdigitate with a plurality of spaced apart outwardly projecting members of another support;

wherein the magnetic coupling element is adapted to be releasably coupled to an opposing magnetic coupling element of another support by a magnetic attraction created therebetween with the plurality of projecting members of one support being received interdigitated with a plurality of projecting members of another support, and wherein the projecting members are adapted to support the first and second ends of a body of another support.

19. The support of claim 18, wherein the magnetic coupling element comprise a pair of spaced apart magnets having opposite magnetic polarity.

20. The support of claim 18, wherein the plurality of projecting members have tapered sidewall and a sloped leading edge.

21. The support of claim 18, wherein the body comprises a planar body of HIPS having a thickness in the range of 0.5 mm-2 mm.

22. The support of claim 18, wherein the coupling member includes a housing for receiving the magnetic coupling element and having a slot, wherein the body includes a tab received within the slot.

23. A system operative with a mobile computing device comprising:

at least one mobile device operative by a mobile computing device for controlled movement in a plurality of directions;

a plurality of bodies having an upper surface and a lower surface, the bodies having spaced apart first and second ends, said plurality of bodies constructed to be assembled in end-to-end relationship to support the mobile device upon movement of the mobile device in the plurality of directions;

a coupling member arranged adjacent to the first end and the second end of the plurality of bodies, each coupling member having a plurality of outwardly projecting members configured to interdigitate and to extend underlying the lower surface of an adjacent body providing support at an interface between ends of adjacent bodies when assembled;

a first magnetic coupling element attached adjacent the first end and the second end of the bodies; and a second magnetic coupling element attached adjacent the first end and the second end of the bodies in spaced apart relationship to the first coupling element;

wherein the first and second coupling elements are adapted to be releasably coupled to an opposing coupling element of another support when arranged adjacent thereto by a magnetic attraction force created therebetween.

24. The system of claim 23, wherein the first coupling element comprises a first magnetic field creating element having a first magnetically polarized orientation; and wherein the second coupling element comprises a second magnetic field creating element having a second magnetically polarized orientation opposite the first magnetically polarized orientation.

25. The system of claim 23, wherein the first and second magnetic field creating elements are selected from the group consisting of ferromagnetic magnets and rare earth magnets.

26. The system of claim 23, wherein the first coupling element comprises a magnetic field creating element; and wherein the second coupling element comprises an attractive element responsive to a magnetic field created by the magnetic field creating element.

27. The system of claim 26, wherein the magnetic field creating element is selected from the group consisting of ferromagnetic magnets and rare earth magnets.

28. The system of claim 23, wherein the bodies have a thickness in the range of 0.5 mm-2 mm.

29. The system of claim 28 wherein the bodies are selected from the group consisting of HIPS, ABS, HDPE, and PC.

30. The system of claim 23, wherein the projecting members include a sloped leading edge and tapered sidewalls.

31. The system of claim 30, further including a housing receiving the first and second coupling elements, wherein the housing includes a slot; and wherein the bodies include a tab extending into the slot at least partially obstructing the cavity.

32. The system of claim 23, further including a plurality of accessories for the system having a clip configured to be releasably attached to a side edge of the plurality of bodies.

33. The system of claim 32, wherein the accessories comprise guard rails and elevation members.

34. The system of claim 23, wherein the plurality of bodies are flexible, and further including at least one clasp adapted to be releasably coupled to at least one flexible body, the clasp configured to cause the at least one flexible body to bow.

35. The system of claim 34, wherein the clasp includes opposing ends formed from a body having a lip providing an opening overlying an upper surface of the clasp.

36. The system of claim 35, wherein the linear distance between the openings overlying the surface of the clasp is less than a width of the at least one flexible body.

* * * * *